United States Patent [19]

Inagawa

[11] Patent Number: 5,107,718
[45] Date of Patent: Apr. 28, 1992

[54] COMBINED HYDRAULIC MOTOR AND SPEED REDUCER

[75] Inventor: Makoto Inagawa, Kawasaki, Japan

[73] Assignee: Kabushiki Kaisha Komatsu Seisakusho, Japan

[21] Appl. No.: 623,412

[22] PCT Filed: Apr. 24, 1990

[86] PCT No.: PCT/JP90/00530

§ 371 Date: Dec. 7, 1990

§ 102(e) Date: Dec. 7, 1990

[87] PCT Pub. No.: WO90/12970

PCT Pub. Date: Nov. 1, 1990

[30] Foreign Application Priority Data

Apr. 24, 1989 [JP] Japan ............... 1-46817[U]

[51] Int. Cl.⁵ .................. F16H 57/04; F01M 9/00
[52] U.S. Cl. ..................... 74/467; 74/606 A; 184/612; 184/104.1; 475/83
[58] Field of Search ............ 74/467, 606 A; 184/6.12, 104.1, 104.3; 475/83

[56] References Cited

U.S. PATENT DOCUMENTS

| | | | |
|---|---|---|---|
| 1,739,779 | 12/1929 | Blood | 184/104.1 X |
| 3,870,907 | 3/1975 | Hoffman | 184/104.1 X |
| 3,972,659 | 9/1976 | Bosch et al. | 475/83 X |
| 4,040,312 | 8/1977 | Tappan et al. | 74/801 |
| 4,523,632 | 6/1985 | Nobukawa et al. | 74/606 A X |
| 4,751,858 | 6/1988 | Iwatsuki | 74/867 |

FOREIGN PATENT DOCUMENTS

| | | | |
|---|---|---|---|
| 128104 | 12/1984 | European Pat. Off. | 475/83 |
| 53-123346 | 9/1978 | Japan. | |
| 57-131658 | 8/1982 | Japan. | |
| 60-7131 | 2/1985 | Japan. | |
| 62-141362 | 6/1987 | Japan. | |
| 1404721 | 6/1985 | U.S.S.R. | 74/606 A |
| 739854 | 11/1955 | United Kingdom | 74/606 A |

Primary Examiner—Allan D. Herrmann
Assistant Examiner—David W. Laub
Attorney, Agent, or Firm—Ronald P. Kananen

[57] ABSTRACT

A combined hydraulic motor and speed reducer intended to improve the service life of sealing members and bearings by cooling lubricating oil within a speed reducer case. The hydraulic motor includes a motor case (1) having a peripheral surface in which a pair of supply/discharge ports (18, 17) are formed in a diametrically opposite relationship and extend axially from one end of the motor case (1) so as to open to a speed reducer case (6). Cool lubricating oil is supplied to the interior of the speed reducer case, and at the same time, high temperature lubricating oil is discharged out of the motor. In this way, the lubricating oil within the speed reducer case is maintained at low temperature.

5 Claims, 2 Drawing Sheets

COMBINED HYDRAULIC MOTOR AND SPEED REDUCER

TECHNICAL FIELD OF THE INVENTION

This invention relates to a hydraulic motor combined with a speed reducer used, for example, as a motor for driving a power shovel.

BACKGROUND OF THE INVENTION

It is well known that a combined hydraulic motor and speed reducer conventionally includes a motor case, a cylindrical rotatable member rotatably supported on the outer periphery of the motor case, and a speed reducer arranged to provide a connection between a rotary shaft of the hydraulic motor and the cylindrical rotatable member. A cover is attached to an open end of the cylindrical rotatable member to form a closed speed reducer case. Lubricating oil is supplied to the speed reducer case to lubricate the speed reducer in an oil bath.

In such a conventional combined hydraulic motor and speed reducer, the hydraulic motor is fixed in position, and the cylindrical rotatable member is connected to a drive sprocket. The cylindrical rotatable member is rotated to drive the drive sprocket and lubricate the speed reducer in an oil bath. By this arrangement, the lubricating oil is stirred within the speed reducer case while the motor is being rotated. This may result in an increase in the temperature or the overheat of the lubricating oil and thus, in a decrease in the service life of seal means such an O-ring, an oil seal and a floating seal and bearings. Therefore, the hydraulic motor can not be rotated in an continuous manner.

SUMMARY OF THE INVENTION

In view of the foregoing, it is a primary object of the present invention to provide a combined hydraulic motor and speed reducer which increases the service life of sealing members and bearings by supplying lubricating oil to a speed reducer case and at the same time, discharging the same out of the speed reducer case so as to maintain the lubricating oil within the speed reducer case at low temperature.

Another object of the present invention is to provide a combined hydraulic motor and speed reducer designed to provide a larger contact area between a motor case and lubricating oil so as to effectively cool the lubricating oil within a speed reducer case.

In order to achieve the foregoing objects, according to a first aspect of the present invention, there is provided a combined hydraulic motor and speed reducer including a cylindrical rotatable member having one open end rotatably supported on the outer periphery of a motor case and the other open end closed by a cover member to provide a speed reducer case, a speed reducer arranged within the speed reducer case and adapted to provide a connection between a rotary shaft of the motor and the cylindrical rotatable member, and lubricating oil supplied to the speed reducer case to lubricate any rotatable parts mounted therewithin, the combined hydraulic motor and speed reducer comprising a pair of supply/discharge ports formed in the peripheral wall of the motor case in a diametrically opposite relationship and extending axially from one end of the motor case so as to open to the speed reducer case.

Also, in order to achieve the foregoing objects, according to a second aspect of the present invention, there is provided a combined hydraulic motor and speed reducer including a cylindrical rotatable member having one open end rotatably supported on the outer periphery of a motor case and the other open end closed by a cover member to provide a speed reducer case, a speed reducer arranged within the speed reducer case and adapted to provide a connection between a rotary shaft of the motor and the cylindrical rotatable member, and lubricating oil supplied to the speed reducer case to lubricate any rotatable parts mounted therewithin, the combined hydraulic motor and speed reducer comprising a plurality of heat exchange fins extending one end of the motor case into the speed reducer case and arranged in a circumferentially equally spaced relationship.

With the present invention, lubricating oil is supplied to the speed reducer case through the supply port and discharged from the speed reducer case through the discharge port. The lubricating oil is thus circulated through the speed reducer case and cooled in an external circulation path. The temperature of the lubricating oil within the speed reducer case is never raised above a limited level if the hydraulic motor is rotated in a continuous manner or at a high speed. This provides a longer service life of sealing members and bearings.

The lubricating oil within the speed reducer case is allowed to largely contact the motor case so as to effectively dissipate heat from the lubricating oil to the outside of the motor case. Thus, the temperature of the lubricating oil is never raised above a limited level if the hydraulic motor is rotated in a continuous manner or at a high speed. This provides a longer service life of sealing members and bearings.

The above and other objects, features and advantages of the present invention will become apparent to those skilled in the art upon making reference to the following description and the accompanying drawings in which preferred embodiments incorporating the principles of the present invention are shown by way of example.

DETAILED DESCRIPTION OF THE PREFERRED EMBODIMENTS

Two preferred embodiments of the present invention will now be described with reference to the accompanying drawings.

Figure 1:
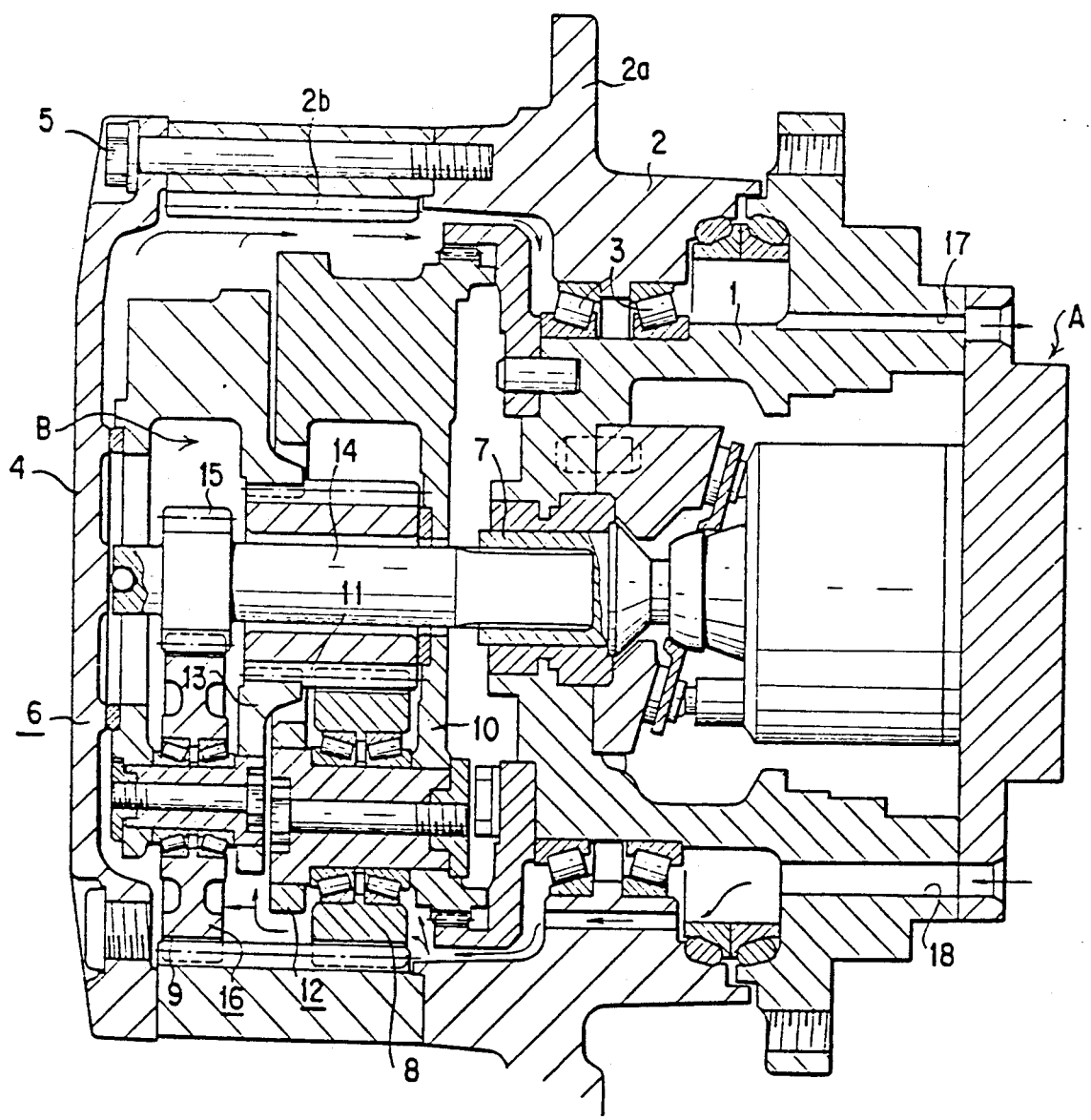
FIGS. 1 and 2 are schematic sectional views of two different embodiments of the present invention.

As shown in FIG. 1, a hydraulic motor A has a motor case 1 around which a cylindrical rotatable member 2 surrounds. The cylindrical rotatable member 2 has one open end rotatably supported through a bearing 3. A cover member 4 is attached to the other open end of the cylindrical rotatable member 2 by a bolt 5 to close the same. The cylindrical rotatable member 2 and the cover member 4 together form a speed reducer case 6. Arranged within the speed reducer case 6 is a speed reducer B through which a rotary shaft 7 and the cylindrical rotatable member 2 are connected together.

The cylindrical rotatable member 2 has a cylindrical member 2a and a ring gear 2b connected to the cylindrical member 2a by a bolt. A first planet gear 8 and a second planet gear 9 are both meshed with the ring gear 2b. The first planet gear 8 is supported by a first carrier 10 and meshed with a first sun gear 11 to constitute a first planetary gear mechanism 12. The second planet gear 9 is supported by a second carrier 13 and meshed with a second sun gear 15 to constitute a second planetary gear mechanism 16. The second carrie 13 is meshed with the first sun gear 11. A drive shaft 14 is splined to the rotary shaft 7 so as to reduce the speed of rotation of the rotary shaft 7. Rotation of the rotary shaft 7 at a reduced speed is then transmitted to the cylindrical rotatable member 2.

A pair of supply/discharge ports 17 and 18 are formed in the peripheral wall of the motor case 1 in a diametrically opposite relation and extend axially from one end of the motor case 1 so as to open to the speed reducer case 6. Lubricating oil, after cooled externally of the case, is introduced to the speed rescuer case 6 through the supply port 18 so as to lubricate any rotatable parts mounted therewithin. Thereafter, the lubricating oil flows out of the case 6 through the discharge port 17 and is again cooled. The lubricating oil is thus repeatedly circulated within the case and then cooled.

Figure 2:
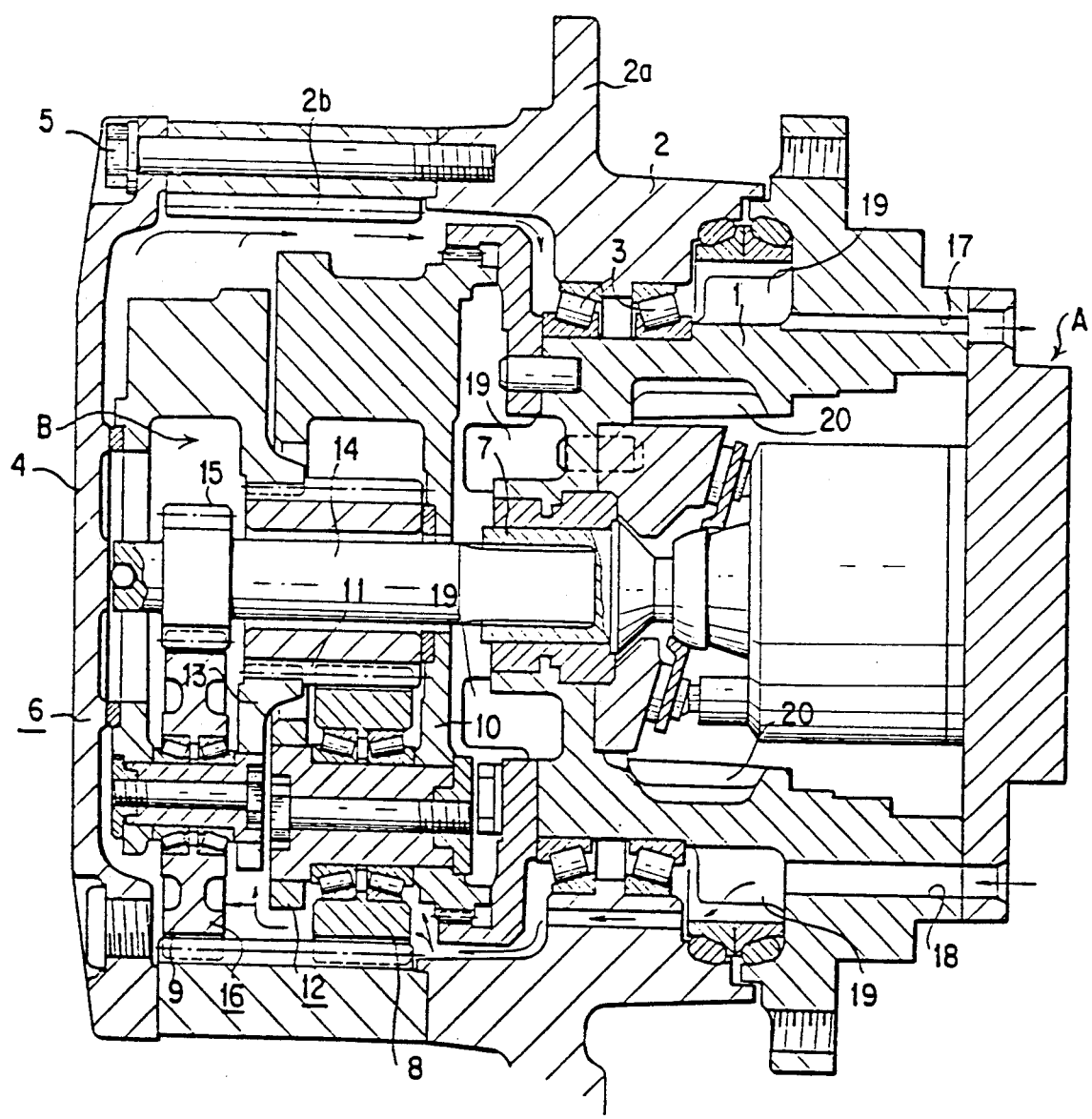

In a second embodiment of the present invention shown in FIG. 2, a plurality of heat exchange fins 19 extend from one end of the motor case 1 into the speed reducer case 6 and are arranged in a circumferentially equally spaced relationship. This provides an increased contact area between the motor case and the lubricating oil within the speed reducer case 6. In this way, head is effectively dissipated from the lubricating oil and discharged out of the motor case 6.

Low pressure oil is also introduced to the motor case 1 through a flushing valve (not shown). A plurality of heat exchange fins 20 are attached to the inner periphery of the motor case 1 so as to transmit heat from the high temperature lubricating oil within the speed reducer case 6 to the low pressure oil to cool the former. This oil is then drained from the motor. In this case, the supply/discharge ports of the first embodiment are not required.

What is claimed is:

1. A combined hydraulic motor and speed reducer including a cylindrical rotatable member having one open end rotatably supported on the outer periphery of a motor case and the other open end closed by a cover member to provide a speed reducer case, a speed reducer arranged within said speed reducer case and adapted to provide a connection between a rotary shaft of the motor and said cylindrical rotatable member, and lubricating oil supplied to said speed reducer case to lubricate any rotatably parts mounted therewithin, said combined hydraulic motor and speed reducer comprising a pair of supply/discharge ports formed in the peripheral wall of said motor case in a diametrically opposite relationship and extending axially from one end of said motor case so as to open to said speed reducer case.

2. A combined hydraulic motor and speed reducer according to claim 1, wherein said motor case includes a plurality of heat exchange fins, said heat exchange fins extending one end of said motor case into said sped reducer case and being arranged in a circumferentially equally spaced relationship.

3. A combined hydraulic motor and speed reducer including a cylindrical rotatable member having one open end rotatably supported on an outer periphery of a motor case and the other open end closed by a cover member to provide a speed reducer case, a speed reducer arranged within said speed reducer case and adapted to provide a connection between a rotary shaft of the hydraulic motor and said cylindrical rotatable member, and lubricating oil supplied to said speed reducer case to lubricate any rotatable parts mounted therewithin, said combined hydraulic motor and speed reducer comprising a plurality of heat exchange fins extending from one end of said motor case into said speed reducer case and arranged in a circumferentially equally spaced relationship.

4. A combined hydraulic motor and speed reducer according to claim 2, wherein said motor case includes heat exchange fins at its inner periphery so that heat is transmitted from the lubricating oil within said speed reducer case to low pressure oil introduced to said motor case.

5. A combined hydraulic motor and speed reducer according to claim 3, wherein said motor case includes heat exchange fins at its inner periphery so that heat is transmitted from the lubricating oil within said speed reducer case to low pressure oil introduced to said motor case.

* * * * *